United States Patent
Kreutzer et al.

(10) Patent No.: US 10,841,377 B2
(45) Date of Patent: Nov. 17, 2020

(54) MANAGING DATA RESOURCES

(71) Applicant: Microsoft Technology Licensing, LLC, Redmond, WA (US)

(72) Inventors: Tor Kreutzer, Tromso (NO); Jan-Ove Almli Karlberg, Tromso (NO); Shamika Ruklan Jayasundara, Oslo (NO); Øystein Fledsberg, Trondheim (NO); Øystein Torbjørnsen, Trondheim (NO); Åge Andre Kvalnes, Mo i Rana (NO); Helge Grenager Solheim, Oslo (NO)

(73) Assignee: Microsoft Technology Licensing, LLC, Redmond, WA (US)

(*) Notice: Subject to any disclaimer, the term of this patent is extended or adjusted under 35 U.S.C. 154(b) by 147 days.

(21) Appl. No.: 16/200,544

(22) Filed: Nov. 26, 2018

(65) Prior Publication Data
US 2020/0169606 A1    May 28, 2020

(51) Int. Cl.
*H04L 29/08* (2006.01)
*G06F 16/903* (2019.01)
*G06F 16/11* (2019.01)
*G06F 16/29* (2019.01)

(52) U.S. Cl.
CPC ........ *H04L 67/1097* (2013.01); *G06F 16/125* (2019.01); *G06F 16/29* (2019.01); *G06F 16/903* (2019.01); *H04L 67/18* (2013.01); *H04L 67/32* (2013.01)

(58) Field of Classification Search
CPC ..... H04L 67/1097; H04L 67/18; H04L 67/32; G06F 16/903; G06F 16/125; G06F 16/29

USPC ......................................................... 707/694
See application file for complete search history.

(56) References Cited

U.S. PATENT DOCUMENTS

| | | | |
|---|---|---|---|
| 8,775,486 B2 | 7/2014 | Carmichael | |
| 9,311,020 B2* | 4/2016 | Reohr | G06F 3/0611 |
| 9,342,557 B2 | 5/2016 | Komacker et al. | |
| 9,491,183 B1* | 11/2016 | Dippenaar | H04L 63/107 |

(Continued)

FOREIGN PATENT DOCUMENTS

WO    2014130484 A1    8/2014

OTHER PUBLICATIONS

Cai, Hong, et al., "Customer Centric Cloud Service Model and a Case Study on Commerce as a Service", CLOUD 2009, Bangalore, India, Sep. 21-25, 2009, pp. 57-64.*

(Continued)

*Primary Examiner* — Robert Stevens

(57) ABSTRACT

A method comprising: storing, in a database, a list of geographical regions in which the party consents to their data being stored; receiving a request to store data of the party, wherein at least one of the data has a region-restriction that restricts the regions in which that data can be stored; determining, based on a respective region-restriction of a respective one of the data, in which of the list of regions the respective data can be stored; storing the data, wherein each respective data is stored in at least one respective storage centre associated with one of the regions according to the determination; storing, in the database, a list comprising a pointer to each respective stored data, wherein the pointer identifies the respective storage centre; receiving a request to retrieve a respective stored data; and using the pointer to route the request to the respective storage centre.

20 Claims, 2 Drawing Sheets

(56) References Cited

U.S. PATENT DOCUMENTS

| | | | |
|---|---|---|---|
| 9,514,324 B1 | 12/2016 | Potlapally et al. | |
| 9,705,873 B2 | 7/2017 | Bishop et al. | |
| 10,248,657 B2* | 4/2019 | Prahlad | G06F 3/0605 |
| 10,642,779 B2 | 5/2020 | Zhu et al. | |
| 2010/0332401 A1* | 12/2010 | Prahlad | H04L 67/1095 |
| | | | 705/80 |
| 2012/0005051 A1* | 1/2012 | Deng | G06O 30/04 |
| | | | 705/34 |
| 2013/0097680 A1 | 4/2013 | Bendapudi et al. | |
| 2017/0199924 A1* | 7/2017 | Gokhale | G06F 16/27 |
| 2017/0277713 A1 | 9/2017 | Strauss et al. | |
| 2018/0205739 A1 | 7/2018 | Sommerfelt et al. | |

OTHER PUBLICATIONS

"International Search Report and Written Opinion Issued in PCT Application No. PCT/US19/062082", dated Feb. 18, 2020, 12 Pages.

"Amazon DynamoDB", Retrieved from https://web.archive.org/web/20180717130221/https://aws.amazon.com/dynamodb/, Jul. 17, 2018, 8 Pages.

"Amazon DynamoDB—Global Tables", Retrieved From: https://web.archive.org/web/20171202053947/http://docs.aws.amazon.com:80/amazondynamodb/latest/developerguide/GlobalTables.html, Dec. 2, 2017, 2 Pages.

Babu, et al., "Secure Cloud Multi-tenant Applications with Cache in PaaS", In Proceedings of Innovations in Bio Inspired Computing and Applications, Dec. 16, 2015, pp. 15-27.

* cited by examiner

MANAGING DATA RESOURCES

BACKGROUND

As the number of users and applications around the world grows, there is an ever increasing need for more efficient management of storage of various data resources. These data resources may include for example: files such as spreadsheets, word processing documents, slide presentations, images, videos, etc.; stored communication histories such as emails, IM chat history, etc.; user profile information such as contact details, social media profiles, etc.; and/or sites such as websites, document sharing sites, etc. Such data resources may originate from a variety of applications installed on the users' terminals and/or hosted online, such as word processing applications, spreadsheet applications, social media applications, file sharing applications, etc.

Online storage has grown in popularity. Using online storage such data resources can be stored online on the "cloud", meaning the data resources are stored on a server system accessible via the Internet, the server system typically comprising multiple server units implemented in more than one storage centre and/or geographic region (i.e. geographical location). Techniques for distributed storage and processing via a network such as the Internet are known in the art.

It is also known for users to make their own data resources available to other users, such as those within the same organization (e.g. company). For instance this may allow one or more other users to view the data resource, subscribe to updates to the data resource, or even modify the data resource.

SUMMARY

A server system may be used to ingest data resources of a party (e.g. an organisation) from one storage centre to one or more different storage centres. A problem arises when the data resources have region restrictions imposed by the party. The party may only consent to their data resources being stored in a particular geographical region (e.g. a particular country). When a user (e.g. a member of the organisation) initiates a query request to query the data resources of the party, it is desirable for the storage system to execute queries as quickly as possible.

Hence according to one aspect disclosed herein, there is provided a server system comprising one or more server units, the server system storing a manager function arranged to run on one or more processors of the one or more server units, and the manager function being configured to perform the following operations. The manager function stores, in a database, a list of geographical regions in which a party consents to their data resources being stored. A storage request to store data resources of the party is received by the manager function. At least one of the data resources has a region-restriction that restricts the geographical regions in which that data resource can be stored. The manager function determines, based on a respective region-restriction of a respective one of the data resources, in which of the list of geographical regions the at least one data resource can be stored. According to that determination, the manager function stores the data resources. Each respective data resource is stored in at least one respective storage centre associated with at least one of the geographical regions. The manager function also stores, in the database, a list comprising a respective pointer to each respective stored data resource, wherein the respective pointer identifies the at least one respective storage centre. A query request to retrieve a respective stored data resource is received by the manager function, which uses the respective pointer to route the query request to the at least one respective storage centre.

Embodiments of the invention provide a means of centralising knowledge about where data resources of the party can be stored in a more consolidated way when those data resources are associated with region-restrictions. The data resources may originate from many storage centres (e.g. back-end servers) across multiple geographies. Each data resource may have imposed restrictions on where it may be stored (e.g. it may be tied to a specific geographical region). When a storage request is received, the manager function can determine where data resources of the party can be stored whilst honouring the region-restrictions associated with the data resources (which may have been set by the party). When a query request is received (e.g. from a user device of a party member), the manager function can determine where data resources for the party reside in order to route the request to the correct storage centre. This reduces roundtrip latency compared to the source directing query requests to each storage centre where the data resources may be stored, i.e. fanning out query requests across all storage centres.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
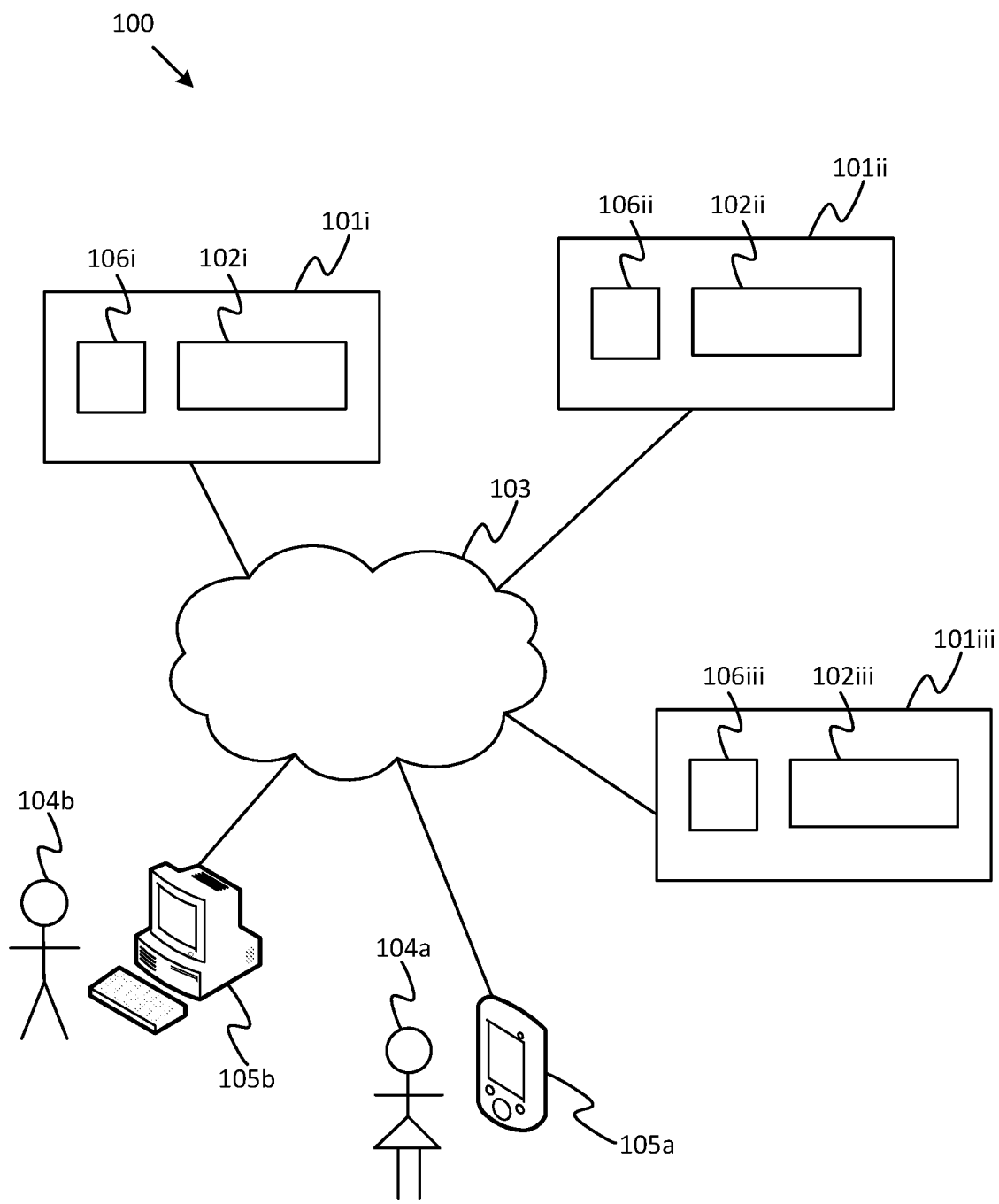
FIG. 1 is a schematic block diagram of a storage system.

FIG. 1 shows a server system 100 in accordance with embodiments of the present disclosure. The server system comprises a plurality of server units 101, each for example being a distinct module (separate casing) on a server rack, or being located in a different room or storage centre. Some or all of the server units 101 may even be located at different geographic locations, including the possibility of different towns, cities, counties, states, countries or even continents. Each server unit 101 comprises a respective memory 102 formed of one or more memory devices, which may comprise for example one or more magnetic memory devices such as one or more hard drives and/or one or more electronic memory devices such as one or more solid state drives (SSD), or a combination of any such memory devices. By way of illustration only three server units 101*i*, 101*ii*, 101*iii* and their respective memories 102*i*, 102*ii*, 102*iii* are shown in FIG. 1, but it will be appreciated that many more may in fact be included in the system.

The server units 101 are networked together via a suitable packet-switched network 103, e.g. a wide-area internetwork such as that commonly referred to as the Internet, or a private intranet. The network 103 may be implemented by any suitable wired and or wireless communication medium or media, e.g. the wired infrastructure of the internet, and/or one or more wireless networks such as a wireless cellular network, wireless local area network(s), etc. By whatever means implemented, the network 103 enables the server units 101 to act together to provide a distributed storage system accessible to users 104 from their respective user terminals 105 via the network 101. Each user terminal 105 may take any suitable for accessing the network 103 via a wired or wireless connection, e.g. a desktop computer, laptop computer, tablet, smartphone, smartwatch or a pair of smart-glasses (and the different user terminals do not all have to take the same form). Two particular users 104*a* and 104*b* and their respective user terminals 105*a*, 105*b* are shown in FIG. 1 by way of illustration, but again it will be appreciated that the system may serve many more users 104 who access the system from many respective user terminals 105.

By way of example, the server system 100 may be arranged to provide storage services to a plurality of parties (i.e. organizations) being customers or "tenants" of the provider of the system.

The server system 100 stores data resources, where each data resources may comprise any item or collection of digital information, e.g. a file, a stored communication, user profile information, or a site of some kind. Examples of files include word processing documents, spreadsheets, slide decks, images, videos, etc. Examples of stored communications include emails, or IM (instant messaging) chat histories. Examples of user profile information include contact details (e.g. "contact cards") and social media profiles. Examples of sites include document sharing sites, websites, and collaborative sites. Anywhere where a data resource is referred to herein, this may refer to any of the above-mentioned data resources or others (and the different data resources need not all by of the same type).

The memories 102 of the server units 101 store the data resources (e.g. files, emails, etc.) of the various users 104, wherein the users can make these stored data resources available to others of the users within the party to enable them perform a certain activity or activities, such as to view or modify the data resources to which they have access.

The server system 100 is managed by a manager function 106. In accordance with embodiments disclosed herein, the manager function 106 may be implemented in the form of a distributed function, i.e. with a respective instance of the manager function 106*i*, 106*ii*, 106*iii* running on each of the server units 101*i*, 101*ii*, 101*iii*. Each instance of the manager function 106 may take the form of software stored on part of the memory 102 of the respective server unit 101 and arranged to run on a respective processing apparatus (not shown) of the respective server unit 101 (the processing apparatus comprising one or more microprocessors each with one or more cores). Note also that the possibility of a centralized manager function 106 is not excluded.

Figure 2:
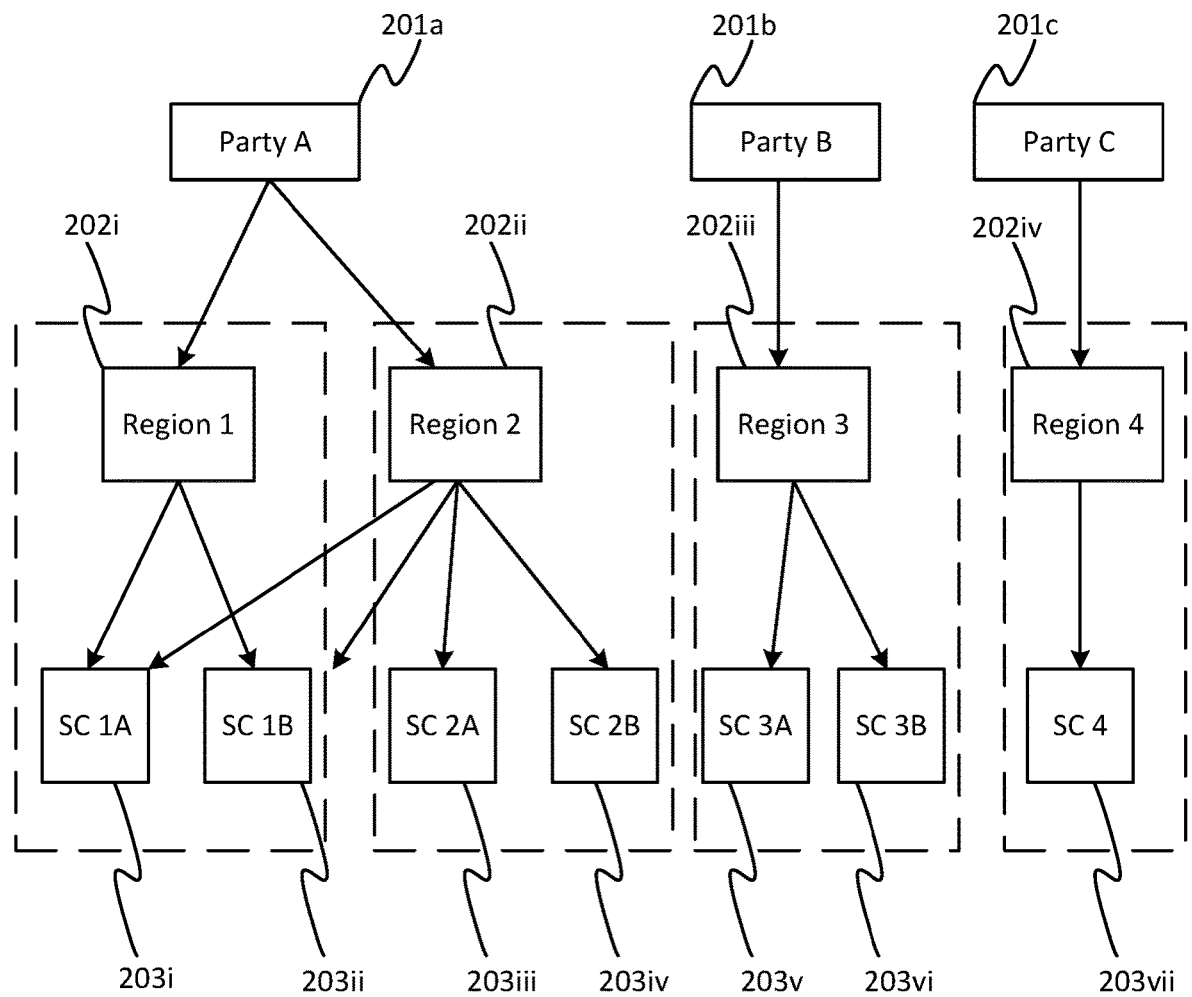
FIG. 2 is a schematic diagram of example associations between storage locations and geographical regions.

FIG. 2 illustrates an example set of mappings between different parties 201 and different geographical regions 202. Three parties 201*a* ("Party A"), 201*b* ("Party B"), and 201*c* ("Party C") and four geographical regions 202*i* ("Region 1"), 202*ii* ("Region 2"), 202*iii* ("Region 3"), and 202*iv* ("Region 4") are shown. Each party 201 represents a different organisation or tenant. Each geographical region 202 represents a different geographical region. A geographical region 202 may be, for example, a city (e.g. London or New York), a country (e.g. United Kingdom or United States of America), a wider political region (e.g. the European Union), a continent (e.g. North America or Asia), and so on. Note however that more generally, a geographical region 202 need not map to a recognised region. In embodiments, a country may be defined herein as a sovereign state, e.g. a member state of the United Nations (UN). For example, a geographical region 202 may comprise a collection of countries that are not related by any particular geographic setting or political alliances. Each geographical region 202 is associated with (e.g. mapped to) one or more storage centres 203 (or data centres). Each storage centre 203 may serve one or more geographical regions. Each storage centre 203 may comprise one or more server units. In some examples, each storage centre is a respective instance of a server unit.

In the example of FIG. 2, Region 1 is associated with storage centre (SC) SC1A and SC1B, Region 2 is associated with SC1A, SC1B, SC2A, and SC2B, Region 3 is associated with SC3A and SC3B, and Region 4 is associated with SC4. A geographical region 202 may be associated with one or more storage centres that are physically located in that geographical region 202. For example, Region 1 may be North America associated with storage centres located on the East (SC1A) and West (SC1B) coasts of the United States. In other examples, a geographical region may be associated with storage centres that may or may not be physically located in that geographical region. For example, Region 2 may be South America associated with storage centres located on the East (SC1A) and West (SC1B) coasts of the United States and storage locations located in Brazil (SC2A) and Argentina (SC2B). Region 3 may be Europe associated with storage centres located in Amsterdam (SC3A) and Paris (SC3B), whilst Region 4 may be Asia Pacific associated with a storage centre located in China.

A party 201 (or tenant) may select one or more geographical regions 202 in which they consent to their data resources being stored. For example, Party A may choose Region 1 and Region 2 as their geographical regions, whilst Party B and Party C select only Region 2 and Region 3 respectively. A party 201 may select a geographical region 202 that has a region-restriction that restricts all data resources stored in that region to being stored in a storage centre 203 physically located in that geographical region 202. These geographical regions may be referred to as "go-local" regions. Alternatively, a party may select a geographical region 202 that does not have a resource-wide region restriction, but some of the data resources stored in that geographical region 202 may have a region-restriction. For example, sensitive data may be given a region-restriction. For example, if Region 2 is selected by Party A, some data resources may be restricted to being stored in the storage centres physically located in Region 2 (i.e. SC2A and SC2B). A party that selects a plurality of regions (e.g. Party A) may be referred to as a "multi-national company".

Embodiments of the present invention will now be described by way of example only. The embodiments will be described with respect to a single party 201 ("the party"), but it will be appreciated that they apply equally to examples having a plurality of parties.

The party 201 has data resources stored on one or more server units (e.g. storage centres) that host a substrate. The substrate may be, for example, a cloud storage system, an email system, etc. Embodiments of the invention provide a mechanism to actively push said data resources to the server system 100, which serves as a low-latency cache. The server system 100 is designed to alleviate the high latencies experienced for some scenarios in the substrate. Scenarios requiring a fan-out to multiple mailboxes are particularly suitable, as this multi-mailbox fanout can be served by a single call to the manager function. The aim of the server system 100 is to serve as a party-wide centralized cache of the party's data resources (e.g. organization-wide relevant content). It provides an alternative to large or complete fan-outs in the substrate.

A manager function, hosted on one or more server units of the server system 100, provides a means of bringing substrate data resources to the server system 100. The data resources originate from the Substrate and are pushed to the server system by a set of processors running on substrate mailboxes. For the avoidance of doubt, anywhere a mailbox is referred to in the present description, this may equally be replaced with an alternate term such as "storage area", "user area", "storage compartment" or the like. Equally, the use of the term mailbox does not limit the data resources to being emails or the like, although they could be.

The manager function is configured to store a list of geographical regions in which the party 201 consents to their data resources being stored. The list is specific to the party 201 and is stored in a central database. The list of geographical regions may be directly chosen by the party 201, e.g. during a sign-up procedure. The geographical regions may instead be determined based on a geographical dependent property of the party 201. For example, a network address (e.g. an IP address) or the location of one or more mailboxes may be used to select a geographical region 202. As another example, the geographical regions in which the party's data resources are currently stored in the substrate may be taken as the geographical regions in which the party 201 consents to their data being stored in the server system 100.

The manager function receives a storage request to store (or ingest) data resources of the party 201. The storage request may be received from the user device or a user who is a member of the party 201 (e.g. an employee and/or administrator of an organisation). The storage request may be directly pushed from the user device or indirectly pushed. That is, a request to ingest data may be transmitted automatically, e.g. whenever new data resources are created or uploaded to the substrate. Alternatively, the storage request may be received from a server of the party 201, e.g. a server hosting the Substrate. In some examples, the storage requests are event-based, e.g. triggered by create, update, and delete events on data resources in the substrate mailboxes. All relevant updates may be pushed to the manager function.

One, some or all of the data resources have a respective region-restriction. For example, data resources may be classified as geo-restricted. That is, those data resources should never be stored outside of a pre-determined geographical region 202. Non geo-restricted data may be stored in multiple geographical regions, e.g. the regions consented to by the party 201. The party 201 may add, modify or delete region-restrictions of respective data resources. For example, the party 201 may mark restricted data resources as not-region-restricted and vice versa. Some region-restricted data resources must not be stored outside of the originating geographical region 202. For example, a data resource originating from North America must be stored in a storage centre 203 mapped to North America. As another example of a region-restriction, any data resources originating from a go-local region must not be stored outside of those regions. A region-restriction may restrict a data resource to being stored in a storage centre 203 physically located in one or more of the geographical regions. For example, a data resource may be restricted to being stored in a storage centre 203 that is located in Europe.

The manager function determines which of the geographical regions a respective data resource can be stored in, based on any region-restriction of that data resource. For example, the manager function may use the database as a look-up table to check if any of the stored geographical regions satisfy the region-restriction of the data resource.

The manager function then stores the data resource in one or more storage centres associated with (i.e. mapped to) a geographical region 202 that the data resource can be stored in. The manager function may store the data resource in all of the storage centres associated with that geographical region 202. The manager function may store the data resource in more than one geographical region 202, and in that case, in some or all of the storage centres of those geographical regions. For example, the manager function may store the data resource in at least one storage centre 203 mapped to a first geographical region (e.g. North America), and at least one storage centre 203 mapped to a second, different geographical region (e.g. South America).

The manager function is configured to store, in the database, a list comprising a pointer to the data resource, i.e. the data resource that has been stored in the storage centre(s). If more than one data resource is stored (e.g. ingested from the substrate), a respective pointer to each data resource is stored in the list. The pointers identify which storage centre(s) a data resource has been stored in.

Data resources stored in a storage centre 203 of the server system 100 may be queried (or accessed, viewed, retrieved, etc.). When the manager function receives a query request, the manager function uses the pointers stored in the database to route the query request to the correct storage centre(s). For example, the manager function looks up the pointer associated with the queried data resource in the database and forwards the request to the storage centre 203 identified by the pointer. Preferably, the storage centre where the data resource is stored is a storage centre that hosts the management function (e.g. that hosts the database where the pointer is being looked up). The query request may be received from a user device. For example, a user device of a user of the party 201.

In the case of the data resource having a region-restriction that restricts that data resource to being stored in a storage centre 203 physically located in a geographical region 202 (e.g. the first geographical region), the manager function determines that the data resource can be stored in the first geographical region and in response, stores the data resource in a storage centre 203 mapped to the first geographical region. Whilst the data resource itself cannot be stored in another geographical region (due to the region-restriction), the manager function may store a reference to the data resource in the data centre(s) of another geographical region (e.g. the second geographical region). The reference may indicate where the data resource is stored in the substrate. The reference may point to the original substrate storage centre (or mailbox). There may also be reasons other than region-restrictions that mean that only a reference to the substrate mailbox is stored in a storage centre, e.g. costs, latencies, etc. The reference may be a link to the data resource. The reference may additionally comprise one or more items of metadata associated with the data file. An example of an item of metadata is the last time or date when the data resource was modified by any user, the identity of the last user to modify the resource, the title of the resource, and/or the file size. Alternatively or additionally, the metadata may comprise personal metadata (personal in the sense that it is specific to a particular user, not necessarily in the sense of being private). An example is the last time or date when the data resource was modified by the particular user whose mailbox the data resource was ingested from.

In some embodiments, each party 201 has a "home region" in the server system 100, in which all data resources has some representation. This representation can be either full (if the data resource can be stored in the home region), or shallow (if the data cannot be stored in the home region), e.g. a limited set of metadata and a reference. Data resources that are geo-restricted to a specific geographical region 202 cannot be moved out of said region. If the data resource is restricted to a region different from the party's home region, a shallow representation of the data resource is stored in the home region. The shallow representation contains a reference to the full representation (e.g. in another storage centre 203, or the substrate mailbox hosting the data resource). If a storage centre 203 is present in the region to which the data resource is restricted, the full representation is pushed to that storage centre 203.

In the case of the data resource having a region restriction that restricts the data resource to being stored in a storage centre 203 associated with the geographical region 202 (e.g. the first geographical region) in which the data resource originates, the manager function determines that the data resource can be stored in the first geographical region and in response, stores the data resource in a storage centre 203 mapped to the first geographical region. A reference to the data resource (e.g. a link), and optionally metadata, is stored in at least one storage centre 203 associated with a different geographical region, e.g. the second geographical region.

In some embodiments, one, some or all of the geographical regions may each be associated with (i.e. mapped to) at least two storage centres. If the data resource is stored in more than one storage centre 203 in a single geographical region, the manager function may determine which storage centre 203 is closest to the source of the request and in response, route the query request to that storage centre 203. Here, the closest storage centre 203 may be the physically closest, i.e. the one located within the shortest physical distance. Alternatively, the closest storage centre may not be the physically closest storage centre, rather closeness may be measured in terms of latencies of requests served by the various storage centres. In that sense, the closest storage centre may be the logically closest storage centre, where the logical distance depends on the network link structure, the load on the network itself, the load on the storage and computation resources in the storage centres, etc. The logically closest storage centre may be the physically closest storage centre.

If the data resource is stored in more than one geographical region 202, the manager function may determine which geographical region 202 is closest to the source of the request and in response, route the query request to at least one storage centre 203 in that geographical region 202. The manager function may also route the request to the closest storage centre 203 within the closest geographical region 202.

When a party 201 decides to move between geographical regions, this is detected by the manager function which in turn may ingest (or store) all new and/or previous data resources to the new geographical region. The previous geographical region is no longer fed with updates or new data resources but is alive during the migration process. This ensures that data completeness can be achieved throughout the migration, as all storage centres of the previous geographical region that are storing data resources for the party 201 can be queried. When the migration is completed and all data resources have been moved to the new geographical region(s), the storage centres of the previous geographical region are no longer required (and the data resources in those centres can be deleted).

Furthermore, if a go-local party moves from one geographical region 202 to another in the substrate, the data resources in the server system 100 must be moved from the old geographical region to the new geographical region as soon as possible. The manager function may be required to implement this move within a predetermined time period.

Therefore the manager function may be configured to identify that the data resource to be stored is associated with a new geographical region (or "an additional geographical region"). The additional new geographical region is a geographical region 202 in which the party 201 consents to their data resources being stored. The manager function may perform said identify based on a property of the data resource. For example, the property may indicate a geographical region 202 in which the data resource was created (e.g. a region stamp), or the geographical region 202 in the substrate in which the data resource is being pushed from, i.e. where the storage request is received from. The manager function may compare the geographical region 202 with those already stored in the list in the database to determine if the geographical region 202 is a new region. Alternatively, the manager function may receive an indication from the party 201 that the data resource is to be stored in the new geographical region, e.g. because of a migration of data resources. The manager function adds the new geographical region to the list of geographical regions stored in the database. This therefore allows the data resource to be stored in storage centres associated with the new geographical region.

The manager function may store the data resources in at least one storage centre 203 associated with the new geographical region, depending on the region-restriction associated with the data resource. In some examples, identifying that the data resource is associated with the new geographical region is enough to determine that the data resource can be stored in a storage centre 203 associated with that region. The manager function then updates the list of pointers in the database to include new pointers to the storage centres mapped to the new geographical region. If a query request is received to query the data resource, the manager function uses the new pointer(s) to route the request to the correct storage centre 203.

When a party 201 moves from an old geographical region to a new geographical region, the old geographical region may be retired such that data resources are no longer stored (ingested) at that geographical region. Optionally, data resources stored in a retired region may be deleted.

To support this, the manager function may be configured to receive an indication that one or more of the geographical regions 202 stored in the list of geographical regions (e.g. those selected by the party 201) are to be retired. For example, the party 201 may transmit the indication to the manager function. In response, the manager function stores a list comprising the retired region(s) in the database.

When the manager function determines in which of the geographical regions the data resource can be stored, it consults the list of retired regions and excludes those retired regions from the decision. Instead, the manager function stores data resource in at least one storage centre associated with (mapped to) the new geographical region and stores a pointer to that/those storage centres in the list of pointers.

When a query request is received, the manager function consults the list of pointers and uses both the pointer(s) associated with the retired region(s) (i.e. the pointers to the storage centres mapped to the retired regions in which the data resource is stored) and the pointer(s) to the new geographical region, to route the query request to both the retired and new regions. This ensures that query requests are completed whilst data resources are moved from the retired geographical region to the new geographical region. In other words, the manager function ensures full recall of party 201 data during party 201 moves by determining both the old and new regions.

The manager function may determines that a retired region has been on the list of retired regions for a predetermined time period, and in response, remove that retired region from the list. For example, when the manager function places a geographical region in the list, a respective time-to-live (TTL) may be started for that geographical region 202. The TTL may, for example, be seven days. A retired region may be removed from the list when the TTL expires. As another example, the manager function may determine that no content has been pushed to a storage centre 203 mapped to the retired region within a predetermined time period, and in response remove that retired region from the list. When a retired region is removed from the list of retired regions, the manager function removes, from the list of pointers, the pointers to the storage centres mapped to that geographical region 202. This ensures that a retired region cannot be queried.

In some scenarios a geographical region 202 may be unavailable for ingesting (storing) or querying of data resources. For example, the server system 100 may not be present in all Substrate regions, and so it is necessary to manage from which Substrate regions content is ingested. When ingestion is enabled for a region, it is also necessary to ascertain data completeness before user queries can be served. The manager function may be configured to exclude a geographical region 202 for ingest (covers all parties in that region), exclude a geographical region 202 for queries (covers all parties in that region), exclude ingest for a given party 201 in a specific geographical region 202 (a region/party pair), exclude queries for a given region/party pair, retrieve an exclusion for a given region/party pair, and/or retrieve a set of exclusions with a specific range, e.g. all exclusions in a specific geographical region 202.

The manager function may receive an indication that one or more of the geographical regions is unavailable for storage and/or querying of data resources. For example, if a plurality of new geographical regions are identified, only a subset of those geographical regions may be chosen to be available for ingestion of data resources. As another example, a party 201 may sign up to multiple geographical regions, one or more of which may not be supported by the server system 100.

The manager function may be configured to store, in the database, a list comprising region exclusions. The list of exclusions is consulted when a storage and/or query request is received by the manager function. That is, the manager function may determine in which geographical regions the data resource can be stored based on the list of exclusions (or rather whether a particular region is associated with a storage exclusion).

In some examples, when a new geographical region is covered by the server system 100, data resources may be stored in the storage centres of that geographical region 202 but query requests may be restricted.

In order to conserve storage and management overhead, the lack of an entry in the database indicates that no exclusion is currently active for a geographical region 202 or region/party pair. Due to this, the database is sparsely populated, and this makes it feasible to execute queries over the exclusions with good performance. This means that by default, no exclusions are present for a party 201 or region. This has the following implications: as soon as the new geographical region is activated, content for the parties present in that region will be uploaded to the server system 100, and queries will be servable for the parties present in that region. In order to avoid a bad customer experience due to bad data completeness, the on-boarding of a new geographical region should be paired with an exclusion on queries for that region. For instance, the routing of a query request may be based on the presence or absence of a query exclusion for a given geographical region 202. Only geographical regions that do not have a query exclusion may be queried. When the data resources have been completely ingested in the storage centre(s) of the new geographical region, the query exclusion is lifted and the manager function updates the list of exclusions. This allows query requests to be routed to the storage centres of the new geographical region.

In some scenarios, a storage centre 203 may become unavailable, e.g. due to a failure at the server unit or in the network. A storage centre 203 may also be under a heavy load. It may not be possible to directly detect if a storage centre 203 is unavailable. One way of detecting whether a storage centre 203 is unavailable is by measuring a latency (or delay) in query requests being completed.

For improved latencies, two storage centres are present within each geographical region 202. By leveraging proximity based routing, requests can be routed to the storage centre 203 currently providing the lowest latencies. Typically, picking the "closest" (i.e. the one with the best performance) storage centre 203 can yield drastically better performance than randomly querying one of the storage centres within a geographical region 202. To that end, the manager function may determine the latency for each storage centre 203 in a geographical region 202, and route the query request to the storage centre 203 exhibiting the lowest latency. Furthermore, if data resources for a given party 201 can be hosted in more than one geographical region 202, it may in some cases be more efficient to issue requests to a different region than that of the source making the request (e.g. because of failures or heavy loads). To that end, the manager function may determine the latency of one or more storage centres in each geographical region 202, and route the query request to one or more storage centres in the geographical region 202 exhibiting the lowest latency. The observed latencies may be maintained in the database such that the manager function can route a query request to a storage centre 203 and/or geographical region 202 having an optimal latency. For example, the query request may be routed to the storage centre 203 with the lowest average observed latency over a predetermined period of time.

The manager function maintains a set of sliding windows of observed request latencies to different storage centres. In order to avoid measurements for each endpoint becoming stale, the "sub optimal" storage centre 203 is sampled probabilistically. In addition, a maximum time between requests to each storage centre 203 may be maintained. This ensures that routing decisions are based on up-to-date data. The manager function may configure the window length, probability of sampling, and the maximum time between requests to a given storage centre. By tuning the probability at which sampling is performed, or the maximum age of measurements to different storage centres, it is possible to get the best possible latencies even for high percentiles.

Another way of detecting whether a storage centre 203 is unavailable is by detecting when query requests are unsuccessfully executed by the storage centre. In this case, the manager function is configured to detect when a query request is unsuccessfully executed and in response route query requests to the best performing storage centre 203 (e.g. the one with the lowest latency). Whilst the query requests are being routed to that storage centre, the manager function may send sample requests to the unavailable storage centre. As long as the unavailable storage centre 203 is indeed unavailable, the sample requests will fail. However, when a sample request is executed successfully, the manager function routes the actual query requests to the previously unavailable storage centre. Since the newly available storage centre 203 has not been processing actual query requests it will have the best latency and therefore will be able to quickly process the newly received query requests.

It will be appreciated that the above embodiments have been described by way of example only.

More generally, according to one aspect of the invention there is provided a server system comprising one or more server units, the server system storing a manager function arranged to run on one or more processors of the one or more server units, wherein the manager function is configured to perform operations of: storing, in a database, a list of geographical regions in which a party consents to data resources of said party being stored; receiving a storage request to store data resources of the party, wherein at least one of the data resources has a region-restriction that restricts the geographical regions in which that data resource can be stored; determining, based on a respective region-restriction of a respective one of the data resources, in which of the list of geographical regions the at least one data resource can be stored; storing the data resources, wherein each respective data resource is stored in at least one respective storage centre associated with at least one of the geographical regions according to said determination; storing, in the database, a list comprising a respective pointer to each respective stored data resource, wherein the respective pointer identifies the at least one respective storage centre; and receiving a query request to retrieve a respective stored data resource; and using the respective pointer to route the query request to the at least one respective storage centre.

In embodiments, the region-restriction may restrict the data resource to being stored in a storage centre physically located in a specified one or more of the geographical regions.

In embodiments, the region-restriction may restrict the data resource to being stored in a storage centre associated with the geographical region in which the data resource originates.

In embodiments, said receiving of the storage request may comprise: identifying that the one or more data resources are associated with an additional geographical region in which the party consents to their data resources being stored, and storing the additional geographical region in the list of geographical regions.

In embodiments, the manager function may be configured to: receive an indication that the one or more of the geographical regions are to be retired such that the party no longer consents to their data resources being stored in the retired geographical regions; and store, in the database, a list of the retired geographical regions; wherein said determining comprises excluding the retired geographical regions, wherein said storing of the data resources comprises storing the data resources in at least one additional storage centre associated with the additional geographical region, and wherein the manager function is configured to store a respective additional pointer to each stored data resource in the list comprising the respective pointers, wherein the respective additional pointer identifies the at least one additional storage centre.

In embodiments, said using of the respective pointer may comprise using the additional respective pointer to route the query request to the at least one additional storage centre.

In embodiments, the manager function may be configured to: determine that a respective retired geographical region has been stored in the list of retired geographical regions for a predetermined time period; and in response, remove from the respective lists in the database, the respective retired geographical region and the respective pointer to the at least one storage centre in that retired geographical region.

In embodiments, the geographical regions may comprise a plurality of geographical regions, and wherein said storing of the data resources may comprise: storing each respective data resource in at least one storage centre associated with a first geographical region, and storing each respective data resource in at least one storage centre associated with a second, different geographical region.

In embodiments, said routing may comprise: identifying which of the first and second geographical regions is closest to a source of the query request, and routing the query request to the at least one storage centre associated with the identified geographical region.

In embodiments, the region-restriction may restrict the data resource to being stored in the storage centre physically located in the first geographical region, and wherein said storing may comprise: storing the data resource in at least one storage centre physically located in the first geographical region, and storing a reference to the data resource but not the data resource itself in at least one storage centre associated with the second geographical region.

In embodiments, the data resource may originate from the first geographical region, and wherein said storing may comprise: storing the data resource in at least one storage centre associated with the first geographical region, and storing a reference to the data resource but not the data resource itself in at least one storage centre associated with the second geographical region.

In embodiments, said routing may comprise: measuring a first latency between the manager function and at least one storage centre associated with the first geographical region, and measuring a second latency between the manager function and at least one storage centre associated with the second geographical region, wherein said routing is based on the measured latencies.

In embodiments, the manager function may be configured to maintain in the database, for each storage centre in which the stored data resource is stored, a list of determined latencies; and wherein said routing may comprise routing the query request to the storage centre having an optimal observed latency.

In embodiments, each geographical region may be associated with at least two storage centres, wherein said storing of the data resources may comprise storing each data resource in the at least two storage centres associated with at least one of the geographical regions.

In embodiments, the manager function may be configured to: receive an indication that one or more of the geographical regions is unavailable for storage and/or querying of the data resources; and for each geographical region that is unavailable, storing, in the database, a list of exclusions comprising a respective exclusion that indicates that a respective geographical region is unavailable for storage and/or querying of data resources.

In embodiments, said determining may be based on the presence or absence of a respective exclusion for the respective geographical region.

In embodiments, said routing may be based on the presence or absence a respective exclusion for the respective geographical region, and wherein said routing may comprise only routing the query request to the at least one storage centre associated with the geographical region that is available for querying of data resources.

In embodiments, the server system may comprise the one or more storage centres, wherein each of the storage centres may comprise a respective one or more of said server units.

In embodiments, each of the one or more server units may be a respective one of the one or more storage centres. Alternatively it is not excluded that the storage centres could be implemented on server units other than the one or more server units on which the manager function is implemented.

In embodiments, the manager function may be implemented in a distributed form comprising a respective instance of the manager function at each of the server units.

According to another aspect of the invention there is provided a computer program embodied on computer-readable storage and configured so as when run on a server system comprising one or more server units to perform operations of: storing, in a database, a list of geographical regions in which the party consents to their data resources being stored; receiving a storage request to store data resources of the party, wherein at least one of the data resources has a region-restriction that restricts the geographical regions in which that data resource can be stored; determining, based on a respective region-restriction of a respective one of the data resources, in which of the list of geographical regions the respective data resource can be stored; storing the data resources, wherein each respective data resource is stored in at least one respective storage centre associated with at least one of the geographical regions according to said determination; storing, in the database, a list comprising a respective pointer to each respective stored data resource, wherein the respective pointer identifies the at least one respective storage centre; receiving a query request to retrieve a respective stored data resource; and using the respective pointer to route the query request to the at least one respective storage centre.

In embodiments the computer program may be configured to perform operations corresponding to any of the above system features.

According to another aspect of the invention there is provided a method comprising: storing, in a database, a list of geographical regions in which the party consents to their data resources being stored; receiving a storage request to store data resources of the party, wherein at least one of the data resources has a region-restriction that restricts the geographical regions in which that data resource can be stored; determining, based on a respective region-restriction of a respective one of the data resources, in which of the list of geographical regions the respective data resource can be stored; storing the data resources, wherein each respective data resource is stored in at least one respective storage centre associated with at least one of the geographical regions according to said determination; storing, in the database, a list comprising a respective pointer to each respective stored data resource, wherein the respective pointer identifies the at least one respective storage centre; receiving a query request to retrieve a respective stored data resource; and using the respective pointer to route the query request to the at least one respective storage centre.

In embodiments the method may comprise operations corresponding to any of the above system features.

Other variants or applications may become apparent to a person skilled in the art once given the disclosure herein. The scope of the disclosure is not limited by the above-described embodiments but only by the accompanying claims.

The invention claimed is:

1. A server system comprising one or more server units, the server system storing a manager function arranged to run on one or more processors of the one or more server units, wherein the manager function is configured to perform operations of:
  storing, in a database, a list of geographical regions in which a party consents to data resources of said party being stored;
  receiving a storage request to store data resources of the party, wherein at least one of the data resources has a region-restriction that restricts the geographical regions in which that data resource can be stored;
  determining, based on a respective region-restriction of a respective one of the data resources, in which of the list of geographical regions the at least one data resource can be stored;
  storing the data resources, wherein each respective data resource is stored in at least one respective storage centre associated with at least one of the geographical regions according to said determination;
  storing, in the database, a list comprising a respective pointer to each respective stored data resource, wherein the respective pointer identifies the at least one respective storage centre; and
  receiving a query request to retrieve a respective stored data resource; and using the respective pointer to route the query request to the at least one respective storage centre.

2. The server system according to claim 1, wherein the region-restriction restricts the data resource to being stored in a storage centre physically located in a specified one or more of the geographical regions.

3. The server system according to claim 1, wherein the region-restriction restricts the data resource to being stored in a storage centre associated with the geographical region in which the data resource originates.

4. The server system according to any of claim 1, wherein said receiving of the storage request comprises:
  identifying that the one or more data resources are associated with an additional geographical region in which the party consents to their data resources being stored, and
  storing the additional geographical region in the list of geographical regions.

5. The server system according to claim 4, wherein the manager function is configured to:
  receive an indication that the one or more of the geographical regions are to be retired such that the party no longer consents to their data resources being stored in the retired geographical regions; and
  store, in the database, a list of the retired geographical regions;
  wherein said determining comprises excluding the retired geographical regions, wherein said storing of the data resources comprises
storing the data resources in at least one additional
storage centre associated with the additional geographical region, and
wherein the manager function is configured to store a respective additional pointer to each stored data resource in the list comprising the respective pointers, wherein the respective additional pointer identifies the at least one additional storage centre.

6. The server system according to claim 5, wherein said using comprises using the additional respective pointer to route the query request to the at least one additional storage centre.

7. The server system according to claim 6, wherein the manager function is configured to:
determine that a respective retired geographical region has been stored in the list of retired geographical regions for a predetermined time period; and
in response, remove from the respective lists in the database, the respective retired geographical region and the respective pointer to the at least one storage centre in that retired geographical region.

8. The server system according to claim 1, wherein the geographical regions comprise a plurality of geographical regions, and wherein said storing of the data resources comprises:
storing each respective data resource in at least one storage centre associated with a first geographical region, and
storing each respective data resource in at least one storage centre associated with a second, different geographical region.

9. The server system according to claim 8, wherein said routing comprises:
identifying which of the first and second geographical regions is closest to a source of the query request, and
routing the query request to the at least one storage centre associated with the identified geographical region.

10. The server system according to claim 8, wherein the region-restriction restricts the data resource to being stored in the storage centre physically located in the first geographical region, and wherein said storing comprises:
storing the data resource in at least one storage centre physically located in the first geographical region, and
storing a reference to the data resource but not the data resource itself in at least one storage centre associated with the second geographical region.

11. The server system according to claim 8, wherein the data resource originates from the first geographical region, and wherein said storing comprises:
storing the data resource in at least one storage centre associated with the first geographical region, and
storing a reference to the data resource but not the data resource itself in at least one storage centre associated with the second geographical region.

12. The server system according to claim 8, wherein said routing comprises:
measuring a first latency between the manager function and at least one storage centre associated with the first geographical region, and
measuring a second latency between the manager function and at least one storage centre associated with the second geographical region,
wherein said routing is based on the measured latencies.

13. The server system according to claim 12, wherein the manager function is configured to maintain in the database, for each storage centre in which the stored data resource is stored, a list of determined latencies; and
wherein said routing comprises routing the query request to the storage centre having an optimal observed latency.

14. The server system according to claim 1, wherein each geographical region is associated with at least two storage centres, wherein said storing of the data resources comprises storing each data resource in the at least two storage centres associated with at least one of the geographical regions.

15. The server system according to claim 1, wherein the manager function is configured to:
receive an indication that one or more of the geographical regions is unavailable for storage and/or querying of the data resources; and
for each geographical region that is unavailable, storing, in the database, a list of exclusions comprising a respective exclusion that indicates that a respective geographical region is unavailable for storage and/or querying of data resources.

16. The server system according to claim 15, wherein said determining is based on the presence or absence of a respective exclusion for the respective geographical region.

17. The server system according to claim 15, wherein said routing is based on the presence or absence a respective exclusion for the respective geographical region, and wherein said routing comprises only routing the query request to the at least one storage centre associated with the geographical region that is available for querying of data resources.

18. The server system of claim 1, comprising:
the one or more storage centres, wherein each of the storage centres comprises a respective one or more of said server units.

19. A computer program embodied on computer-readable storage and configured so as when run on a server system comprising one or more server units to perform operations of:
storing, in a database, a list of geographical regions in which the party consents to their data resources being stored;
receiving a storage request to store data resources of the party, wherein at least one of the data resources has a region-restriction that restricts the geographical regions in which that data resource can be stored;
determining, based on a respective region-restriction of a respective one of the data resources, in which of the list of geographical regions the respective data resource can be stored;
storing the data resources, wherein each respective data resource is stored in at least one respective storage centre associated with at least one of the geographical regions according to said determination;
storing, in the database, a list comprising a respective pointer to each respective stored data resource, wherein the respective pointer identifies the at least one respective storage centre;
receiving a query request to retrieve a respective stored data resource; and using the respective pointer to route the query request to the at least one respective storage centre.

20. A method comprising:
storing, in a database, a list of geographical regions in which the party consents to their data resources being stored;
receiving a storage request to store data resources of the party, wherein at least one of the data resources has a region-restriction that restricts the geographical regions in which that data resource can be stored;

determining, based on a respective region-restriction of a respective one of the data resources, in which of the list of geographical regions the respective data resource can be stored;

storing the data resources, wherein each respective data resource is stored in at least one respective storage centre associated with at least one of the geographical regions according to said determination;

storing, in the database, a list comprising a respective pointer to each respective stored data resource, wherein the respective pointer identifies the at least one respective storage centre;

receiving a query request to retrieve a respective stored data resource; and using the respective pointer to route the query request to the at least one respective storage centre.

\* \* \* \* \*